United States Patent
Matsumoto et al.

(10) Patent No.: US 8,761,088 B2
(45) Date of Patent: Jun. 24, 2014

(54) WIRELESS BASE STATION APPARATUS AND WIRELESS COMMUNICATION METHOD

(75) Inventors: Tomoko Matsumoto, Fujimino (JP); Satoshi Konishi, Fujimino (JP)

(73) Assignee: KDDI Corporation, Tokyo (JP)

( * ) Notice: Subject to any disclaimer, the term of this patent is extended or adjusted under 35 U.S.C. 154(b) by 712 days.

(21) Appl. No.: 13/009,123

(22) Filed: Jan. 19, 2011

(65) Prior Publication Data

US 2011/0182236 A1 Jul. 28, 2011

(30) Foreign Application Priority Data

Jan. 28, 2010 (JP) ................. 2010-016856

(51) Int. Cl.
*G01R 31/08* (2006.01)

(52) U.S. Cl.
USPC ........... 370/328; 370/338; 370/337; 370/339; 370/329; 370/330; 455/517; 455/219; 455/225; 455/551; 455/260

(58) Field of Classification Search
USPC .............. 370/338, 337, 339, 328, 329, 330; 455/517, 219, 225, 551, 560
See application file for complete search history.

(56) References Cited

U.S. PATENT DOCUMENTS

| | | | |
|---|---|---|---|
| 2007/0093261 A1* | 4/2007 | Hou et al. ................. | 455/506 |
| 2008/0205329 A1* | 8/2008 | Dominique et al. .......... | 370/328 |
| 2010/0110967 A1* | 5/2010 | Sartori et al. ............. | 370/315 |
| 2011/0116570 A1* | 5/2011 | Kim et al. ................ | 375/295 |
| 2011/0124289 A1* | 5/2011 | Balachandran et al. ..... | 455/63.1 |
| 2011/0255519 A1* | 10/2011 | Tamaki et al. ............. | 370/335 |
| 2012/0093028 A9* | 4/2012 | Mese et al. ............... | 370/254 |

FOREIGN PATENT DOCUMENTS

| | | |
|---|---|---|
| JP | 2012-503912 A | 2/2012 |
| WO | 2008/119216 A1 | 10/2008 |
| WO | 2009/065467 A1 | 5/2009 |
| WO | 2010/034528 A1 | 4/2010 |

OTHER PUBLICATIONS

Ping et al., "Interleave-Division Multiple-Access", IEEE Transactions on Wireless Communications, vol. 5, No. 4, pp. 938-947, Apr. 2006.

(Continued)

*Primary Examiner* — Brandon Renner
*Assistant Examiner* — Abdelnabi Musa
(74) *Attorney, Agent, or Firm* — Morgan, Lewis & Bockius LLP (57) ABSTRACT

A wireless base station apparatus communicates with first terminal devices belonging to the present cell by means of IDMA. The apparatus receives signals sent from the first terminal devices and at least a signal sent from a second terminal device belonging to another cell; separately extracts each received signal from the first terminal devices and the second terminal device from the signals received by the receiver and computes a channel value for each received signal, by using interference replica signals; sends information for requesting a second wireless base station apparatus which communicates with the second terminal device to send a log-likelihood ratio obtained based on a signal received from the second terminal device; performs decoding using the channel value for each first terminal device, and generates a log-likelihood ratio as a decoding result and the corresponding interference replica signal; and performs decoding using the log-likelihood ratio received from said second wireless base station apparatus and the channel value for the second terminal device, and generates a log-likelihood ratio as a decoding result and the corresponding relevant interference replica signal.

7 Claims, 5 Drawing Sheets

(56) References Cited

OTHER PUBLICATIONS

Li et al., "Inter-cell Interference Mitigation based on IDMA", IEEE C802.16m-07/115, pp. 1-6, Jun. 2007.

Shikida et al., Iterative Receiver Employing Simplified Multiuser Detector for MIMO-OFDM IDMA Systems, IEICE Technical Report, Nov. 19, 2009, vol. 109, No. 305, pp. 195-200, RCS2009-166.

Matsumoto et al., A Study on the Performance of Interleave-Division Multiple Access on Uplink in Cellular Systems, IEICE Technical Report, Nov. 4, 2010, vol. 110, No. 268, pp. 5-10, RCS2010-143.

3GPP TSG-RAN WG1 #59, R1-094883, Techniques to cope with high interference in HetNets, Qualcomm Europe, Nov. 12-16, 2009, Jeju, South Korea.

Japanese Office Action dated Feb. 19, 2013 for corresponding International application No. 2010-016856.

* cited by examiner

WIRELESS BASE STATION APPARATUS AND WIRELESS COMMUNICATION METHOD

BACKGROUND OF THE INVENTION

1. Field of the Invention

The present invention basically relates to a wireless base station apparatus and a wireless communication method.

Priority is claimed on Japanese Patent Application No. 2010-016856, filed Jan. 28, 2010, the contents of which are incorporated herein by reference.

2. Description of the Related Art

Accompanied with a recently increasing demand for wireless communication, in particular, by using a portable wireless terminal device, a technique for improving the efficiency of frequency usage has been actively performed.

In Non-Patent Document 1, IDMA (interleave division multiple access) is proposed so as to identify each channel using a plurality of channel interleave patterns. In communication based on the IDMA method, instead of a spreading process of each terminal device during transmission in CDMA (code division multiple access), a wireless base station apparatus performs user separation using individual interleave patterns assigned to communication terminals in advance. In such a case, the entire processing gain can be allocated to encoding, thereby implementing a higher degree of processing gain in comparison with CDMA.

In addition, since no spreading process is performed in each terminal device during transmission, it is necessary for a wireless base station apparatus to perform chip-level multiuser interference cancellation. Since each terminal device uses an individual interleave pattern, it is possible to approximate interference by signals transmitted from another terminal device to a Gaussian distribution. Accordingly, in comparison with a multiuser detector generally used for CDMA, a multiuser detector generally used for IDMA can perform interference cancellation with a low amount of computation.

Additionally, since multiuser reception is assumed in the IDMA communication, application of the relevant communication to uplink in transmission of a cellular (phone) system from each terminal device to a wireless base station apparatus has been widely examined In Non-Patent Document 2 relating to the application of the IDMA method to a cellular system, an individual interleave pattern is assigned to each cell so that the wireless base station apparatus can cancel interference from terminal devices belonging to an adjacent cell.

Figure 5:
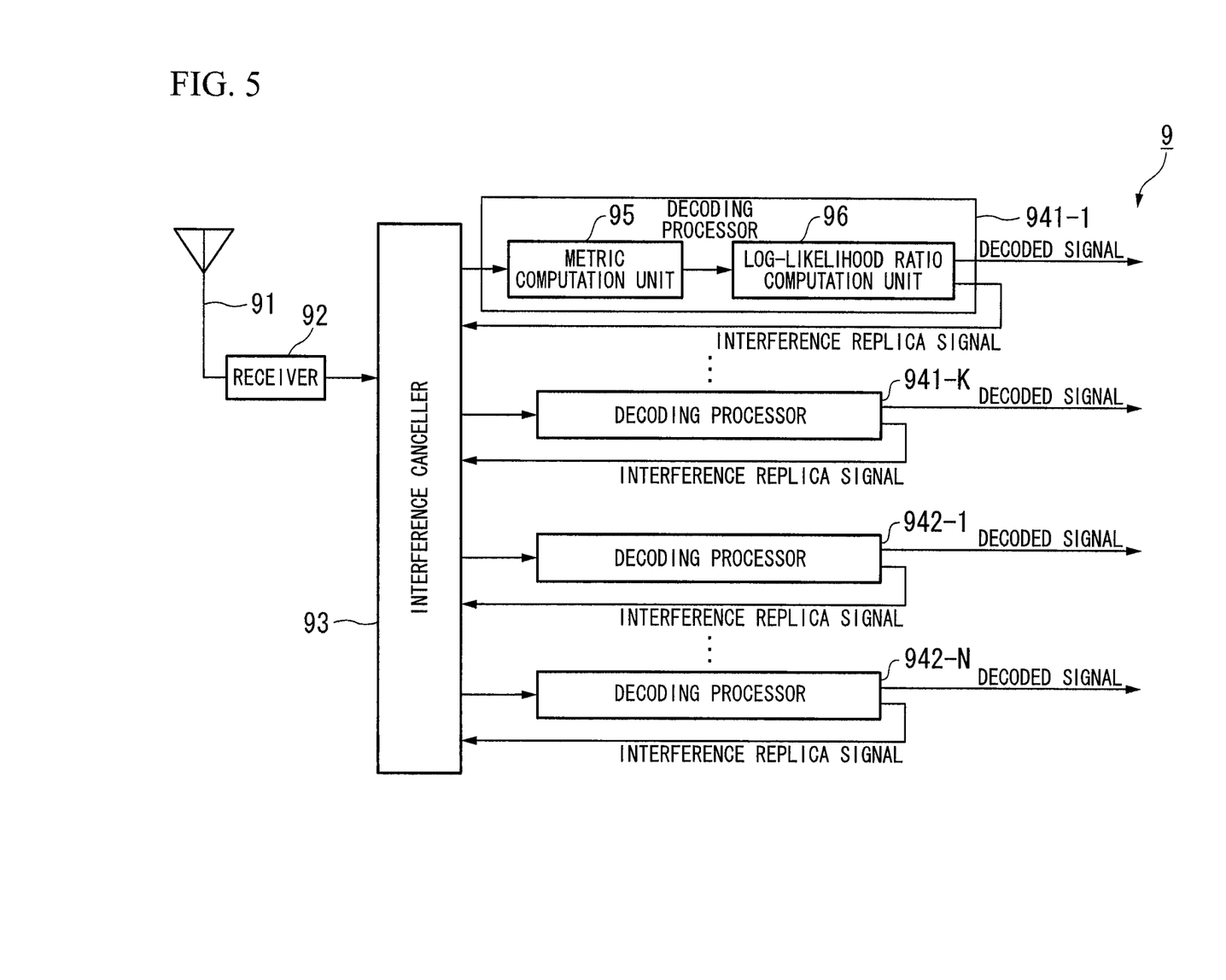
FIG. 5 is a block diagram showing the general structure of a wireless base station apparatus 9 which performs communication with a plurality of terminal devices by means of IDMA.

FIG. 5 is a block diagram showing the general structure of a wireless base station apparatus 9 which performs communication with a plurality of terminal devices by means of IDMA. As shown in FIG. 5, the wireless base station apparatus 9 includes an antenna 91, a receiver 92, an interference canceller 93, and decoding processors 941-1, . . . , 941-K, 942-1, . . . , and 942-N, where K and N are natural numbers.

The receiver 92 receives a signal synthesized using signals sent from a plurality of terminal devices via the antenna 91, and outputs the received signal to the interference canceller 93.

Similar to the CDMA method, the interference canceller 93 performs interference cancellation using estimated channel values (relating to channels) for the respective terminal devices and interference replica signals output from the decoding processors 941-1, . . . , 941-K, 942-1, . . . , and 942-N. In the interference cancellation, interference elements included in the received signal are cancelled, and an estimated channel value is computed for each transmitted signal. The interference canceller 93 outputs the estimated channel values to the decoding processors 941-1, . . . , 941-K, 942-1, . . . , and 942-N.

The decoding processors 941-1, . . . , 941-K, 942-1, . . . , and 942-N have the same structure, and each have a metric computation unit 95 and a log-likelihood ratio computation unit 96. In addition, the decoding processors 941-1, . . . , and 941-K in the present cell perform decoding for the channel values of terminal devices belonging to the present cell, while the decoding processors 942-1, . . . , and 942-N in the present cell perform decoding for the channel values of terminal devices belonging to the other cells.

The metric computation unit 95 computes a metric for a channel value input from the interference canceller 93. Based on the computed metric, the log-likelihood ratio computation unit 96 computes a log-likelihood ratio (LLR) and an interference replica signal, and outputs the computed interference replica signal to the interference canceller 93. The interference replica signal is computed using the log-likelihood ratio obtained in the decoding process, and fed back to the interference canceller 93.

In the wireless base station apparatus 9 having the above-described structure, the interference canceller 93 subtracts the interference replica signal fed back from each decoding processor from the received signal, thereby cancelling interference signals. Repeating such an operation improves the quality of the relevant channel value.

Additionally, the communication using IDMA employs an error correction code having a very low coding rate. Therefore, even if a symbol having a low likelihood is included in the present (target) frame, a desired likelihood can be obtained by means of the coding gain of the relevant error correction code. More specifically, the above-described feedback operation between the interference canceller 93 and the decoding processors 941-1, . . . , 941-K, 942-1, . . . , and 942-N is repeated so as to effectively cancel the interference. In addition, the quality of the signal received by the wireless base station apparatus 9 from each terminal device can be improved by increasing the number of iterations for the feedback of the interference replica signals from the decoding processors 941-1, . . . , 941-K, 942-1, . . . , and 942-N.

Due to such repetition, accuracy of the decoding result and the interference replica signal is improved, and the accuracy is further improved by using an interference replica signal whose accuracy has been improved.

Non-Patent Document 1: Li Ping et al., "Interleave-Division Multiple-Access", IEEE Transactions on Wireless Communications, vol. 5, no. 4, pp. 938-947, April, 2006.

Non-Patent Document 2: Yunzhou Li et al., "Inter-cell Interference Mitigation based on IDMA", IEEE C802.16m-07/115, pp. 1-6, June, 2007.

However, in the wireless base station apparatus 9 in FIG. 5, when electric power of the received signal form a terminal device belonging to another adjacent cell decreases due to attenuation through the relevant channel, a desired likelihood may not be obtained by the error correction through the repetition of the decoding process. In such a case, the interference replica signals generated by the decoding processors 941-1, . . . , 941-K, 942-1, . . . , and 942-N have low accuracy and thus low reliability, which causes a decrease in the convergence speed for the iterative operation, and also causes degradation for the convergent point of the bit error rate. Furthermore, the wireless base station apparatus 9 may degrade the quality of the signal received from a terminal device which belongs to the present cell of the wireless base station apparatus 9.

SUMMARY OF THE INVENTION

In light of the above circumstances, an object of the present invention is to provide a wireless base station apparatus for IDMA communication, by which even when the electric power of the signal received from a terminal device belonging to an adjacent cell decreases, a desired reliability of the generated interference replica signal is obtained, and degradation in the quality of the signal received from a terminal device belonging to the present cell can be prevented.

Therefore, the present invention provides a wireless base station apparatus which communicates with a plurality of first terminal devices belonging to a present cell of the wireless base station apparatus, based on an interleave division multiple access method, the wireless base station apparatus comprising:

a receiver that receives signals sent from the first terminal devices and at least a signal sent from a second terminal device belonging to another cell;

an interference canceller that separately extracts each received signal from the first terminal devices and the second terminal device from the signals received by the receiver and computes a channel value for each received signal, by using interference replica signals;

a controller that sends information for requesting a second wireless base station apparatus which communicates with the second terminal device to send a log-likelihood ratio obtained based on a signal received from the second terminal device;

first decoding processors, each performing decoding using the channel value for each first terminal device, and generating a log-likelihood ratio as a decoding result and the corresponding interference replica signal; and a second decoding processor that performs decoding using the log-likelihood ratio received from said second wireless base station apparatus and the channel value for the second terminal device, and generates a log-likelihood ratio as a decoding result and the corresponding relevant interference replica signal.

Preferably, the second terminal device as a target for generating the channel value and the interference replica signal has reception electric power higher than or equal to a predetermined threshold.

In a typical example, the wireless base station apparatus further comprises a log-likelihood ratio transmitter, wherein when the log-likelihood ratio transmitter receives from said second wireless base station apparatus information for requesting the log-likelihood ratio for at least one of the first terminal devices, the log-likelihood ratio transmitter sends the log-likelihood ratio based on the channel value for the relevant first terminal device.

In such a case, preferably, the log-likelihood ratio transmitter sends the log-likelihood ratio to said second wireless base station apparatus if the log-likelihood ratio includes no error, and does not send the log-likelihood ratio if the log-likelihood ratio includes an error.

The log-likelihood ratio transmitter may send the log-likelihood ratio in a form of a hard-decision value and a reliability coefficient of the log-likelihood ratio.

In a preferable example, when the decoding result of the second terminal device includes an error, the controller sends information for requesting said second wireless base station apparatus to send the log-likelihood ratio for the second terminal device.

The present invention also provides a wireless communication method performed by a wireless base station apparatus which communicates with a plurality of first terminal devices belonging to a present cell of the wireless base station apparatus, based on an interleave division multiple access method, the wireless communication method comprising the steps that:

receives signals sent from the first terminal devices and at least a signal sent from a second terminal device belonging to another cell;

separately extracts each received signal from the first terminal devices and the second terminal device from the signals received by the receiver and computes a channel value for each received signal, by using interference replica signals;

sends information for requesting a second wireless base station apparatus which communicates with the second terminal device to send a log-likelihood ratio obtained based on a signal received from the second terminal device;

performs decoding using the channel value for each first terminal device, and generates a log-likelihood ratio as a decoding result and the corresponding interference replica signal; and performs decoding using the log-likelihood ratio received from said second wireless base station apparatus and the channel value for the second terminal device, and generates a log-likelihood ratio as a decoding result and the corresponding relevant interference replica signal.

In accordance with the present invention, even when the electric power of the signal received from a terminal device belonging to an adjacent cell decreases, a desired reliability of the generated interference replica signal can be secured, thereby improving the reception quality.

DETAILED DESCRIPTION OF THE INVENTION

Hereinafter, an embodiment of the wireless base station apparatus and the wireless communication method in accordance with the present invention will be described with reference to the appended figures.

Figure 1:
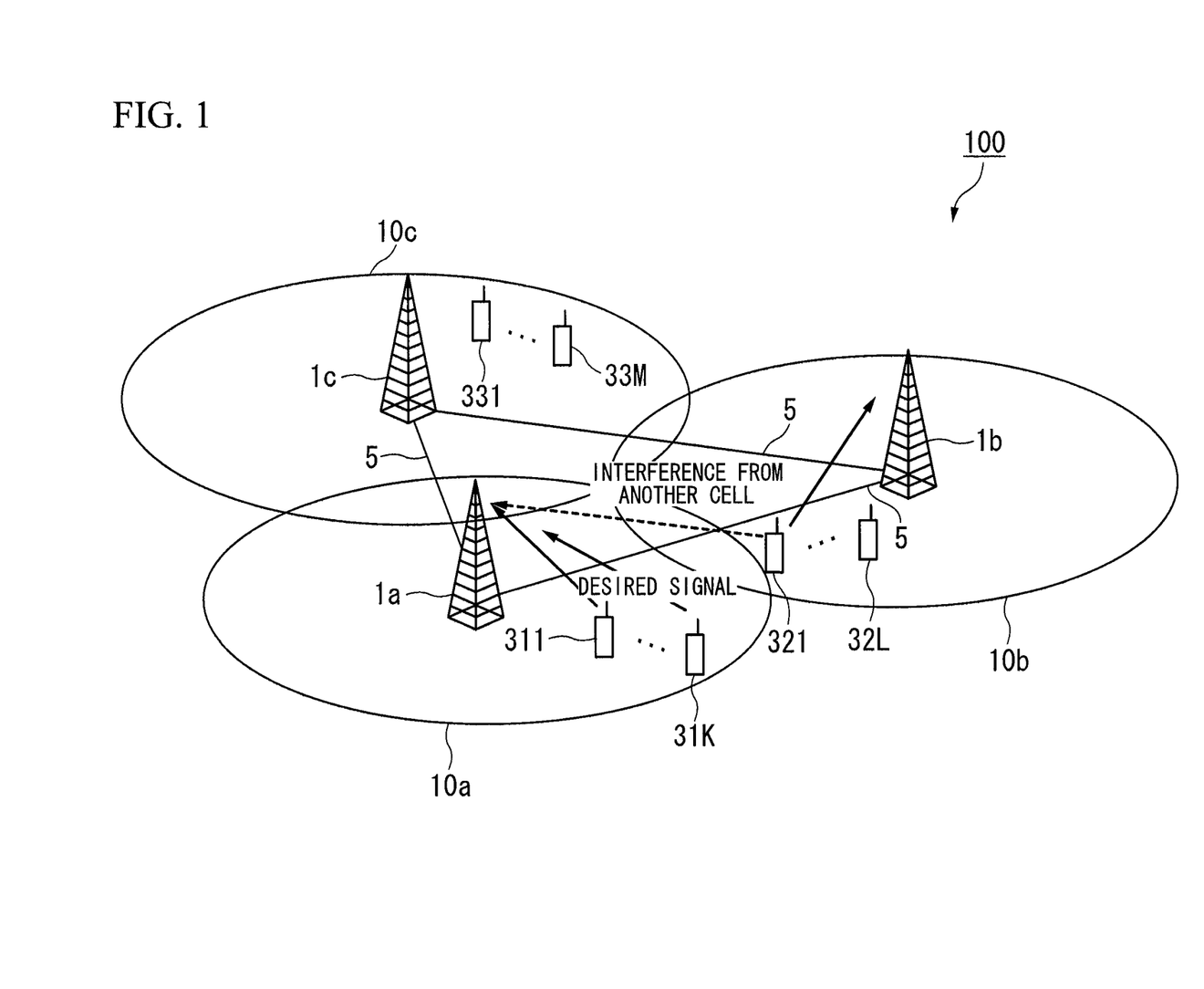
FIG. 1 is a schematic diagram showing an example structure of a wireless communication system 100 in an embodiment of the present invention.

FIG. 1 is a schematic diagram showing an example structure of a wireless communication system 100 in the embodiment of the present invention. In FIG. 1, the wireless communication system 100 includes wireless base station apparatuses 1a, 1b, and 1c, and terminal devices 311, . . . , 31K, 321, . . . , 32L, 331, . . . , and 33M, where K, L, and M are natural numbers.

The wireless base station apparatuses 1a, 1b, and 1c have the same structure, where any one of them is called a "wireless base station apparatus 1" and two or more of them are collectively called "wireless base station apparatuses 1". Similarly, the terminal devices 311, . . . , 31K, 321, . . . , 32L, 331, . . . , and 33M have the same structure, where any one of them is called a "terminal device 300" and two or more of them are collectively called "terminal devices 300".

The wireless base station apparatuses 1a, 1b, and 1c communicate with the terminal devices 300, and a base station ID (identifier) is assigned in advance to each wireless base station apparatus so as to uniquely identify the relevant wireless base station apparatus. Each wireless base station apparatus 1 is connected with each of the other wireless base station apparatuses 1 via backhaul lines 5.

The wireless base station apparatuses 1a, 1b, and 1c respectively form cells 10a to 10c. In each cell, data transmission and reception to and from the relevant terminal devices 300 can be performed. Specifically, the terminal devices 311, . . . , and 31K belong to the cell 10a, and data transmission and reception is performed between the terminal devices 311, . . . , and 31K and the wireless base station apparatus 1a. The terminal devices 321, . . . , and 32L belong to the cell 10b, and data transmission and reception is performed between the terminal devices 321, . . . , and 32L and the wireless base station apparatus 1b. The terminal devices 331, . . . , and 33M belong to the cell 10c, and data transmission and reception is performed between the terminal devices 331, . . . , and 33M and the wireless base station apparatus 1c.

The terminal device 300 is a communication device which communicates with the wireless base station apparatus 1 by means of the IDMA method. A unique terminal ID (identifier) for uniquely identify each terminal device and a unique individual interleave pattern are assigned in advance to the relevant terminal device.

In the present embodiment, three wireless base station apparatuses are arranged in the wireless communication system 100. However, the wireless communication system is not limited to this arrangement, and at least two wireless base station apparatuses are arranged in a wireless communication system formed in accordance with the present invention.

Figure 2:
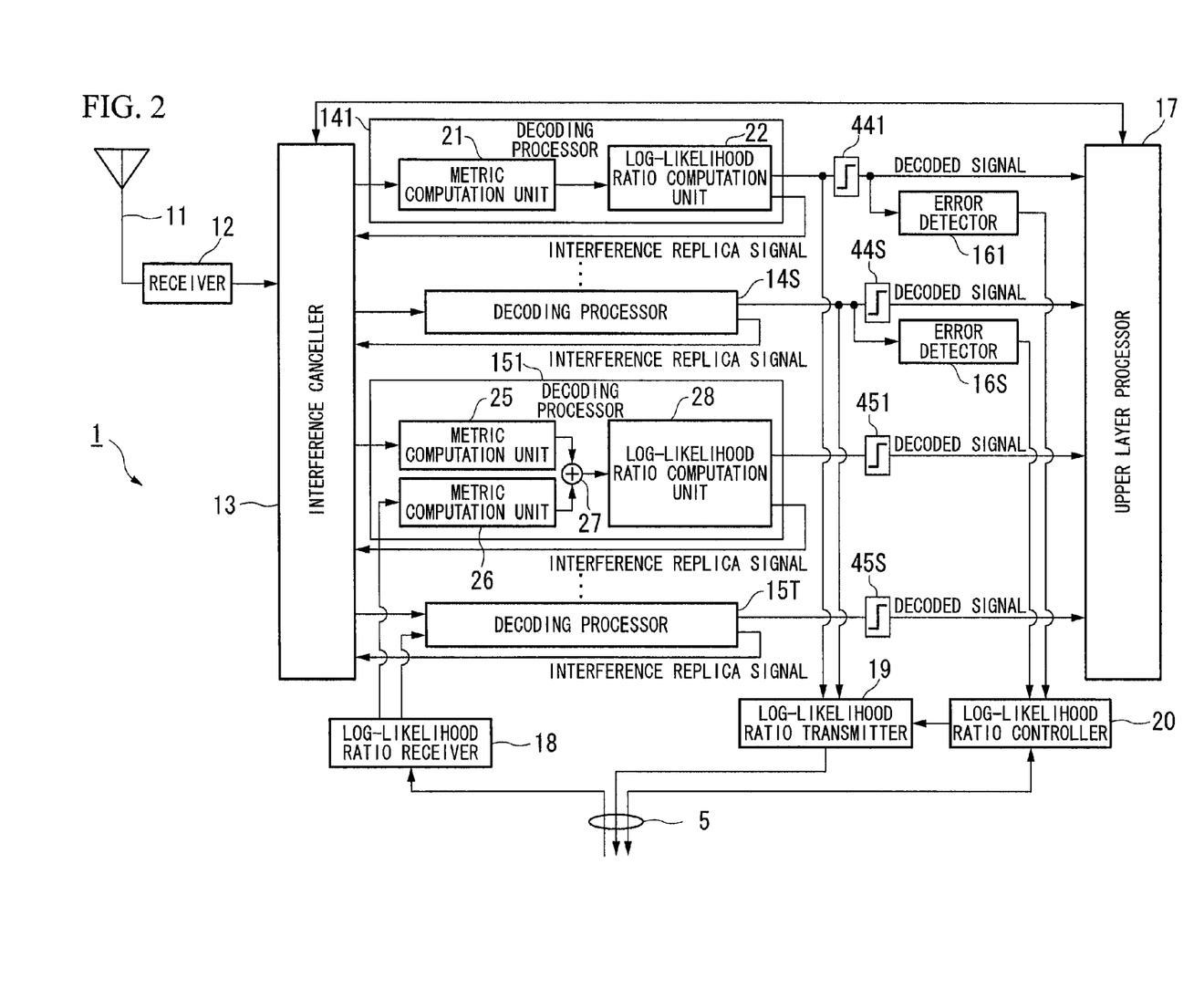
FIG. 2 is a block diagram showing the general structure of the wireless base station apparatus 1 in the embodiment.

FIG. 2 is a block diagram showing the general structure of the wireless base station apparatus 1 (the structure of the wireless base station apparatus 1a is representatively shown). As shown in FIG. 2, the wireless base station apparatus 1 includes an antenna 11, a receiver 12, an interference canceller 13, decoding processors 141 to 14S (S is a natural number), decoding processors 151 to 15T (T is a natural number), error detectors 161 to 16S, an upper layer processor 17, a log-likelihood ratio receiver 18, a log-likelihood ratio transmitter 19, a log-likelihood ratio controller 20, hard-decision units 441 to 44S, and hard-decision units 451 to 45T.

The receiver 12 receives a signal sent from the terminal devices 300 via the antenna 11, and outputs the received signal to the interference canceller 13. The signal received by the receiver 12 is a synthesized signal which includes not only signals sent from the terminal devices 300 belonging to the present cell as communication parties, but also signals sent from the terminal devices 300 belonging to the other cells.

Similar to noise cancelling in CDMA, the interference canceller 13 performs interference cancellation for the received signal (input into the interference canceller 93) by using estimated channel values (relating to channels) for the respective terminal devices 300 and interference replica signals output from the decoding processors 141 to 14S and 151 to 15T, so as to compute an estimated channel value for the signal transmitted from each terminal device 300. This channel value is an estimated value of the signal which were transmitted from each of the terminal devices 300 and are included in the received signal. The channel values are output to the decoding processors 141 to 14S and 151 to 15T.

The interference canceller 13 also computes reception electric power of the signal received from each of the terminal devices 300 by means of the preamble of the signal or the like, and outputs the computed reception electric power of each terminal device 300 to the upper layer processor 17.

The decoding processors 141 to 14S have the same structure, and are subjected to decoding of the signals sent from the terminal devices 300 as communication parties of the present wireless base station apparatus 1. Into the decoding processors 141 to 14S, the channel values corresponding to the relevant (allocated) terminal devices 300 are input from the interference canceller 13. The decoding processors 141 to 14S each perform decoding for the input channel value, and generates a log-likelihood ratio and an interference replica signal. The decoding processors 141 to 14S each have a metric computation unit 21 and a log-likelihood ratio computation unit 22.

Based on the channel value input from the interference canceller 13, the metric computation unit 21 computes a metric for the channel value. Based on the computed metric, the log-likelihood ratio computation unit 22 computes a log-likelihood ratio, and outputs the log-likelihood ratio (as the decoding result) and an interference replica signal.

The decoding processors 151 to 15T have the same structure, and are subjected to decoding of the signals sent from the terminal devices 300 which are not communication parties of the present wireless base station apparatus 1, and thus belong to the other cells. Into the decoding processors 151 to 15T, the channel values corresponding to the relevant (allocated) terminal devices 300 are input from the interference canceller 13. The decoding processors 151 to 15T each perform decoding for the input channel value, and generate a log-likelihood ratio (i.e., decoding result) and an interference replica signal. The decoding processors 151 to 15T each have metric computation units 25 and 26, a synthesizer 27, and a log-likelihood ratio computation unit 28.

The metric computation unit 25 has the same structure as the metric computation unit 21, and computes a metric for the channel value received from the interference canceller 13.

The metric computation unit 26 has a structure similar to the metric computation unit 21, and computes a metric based on the log-likelihood ratio received from the log-likelihood ratio receiver 18.

The synthesizer 27 synthesizes the metrics computed by the metric computation units 25 and 26 by means of addition.

The log-likelihood ratio computation unit 28 has the same structure as the log-likelihood ratio computation unit 22, and computes a log-likelihood ratio based on the metric synthesized by the synthesizer 27. The log-likelihood ratio computation unit 28 outputs the log-likelihood ratio (i.e., decoding result) and an interference replica signal.

The interference replica signal output from each of the log-likelihood ratio computation units 22 and 28 is a replica of the signal sent from the relevant wireless base station apparatus 300, and is computed using the log-likelihood ratio obtained by the decoding process. The decoding result output from each of the log-likelihood ratio computation units 22 and 28 is the log-likelihood ratio, that is, a soft-decision value.

The hard-decision units 441 to 44S are respectively assigned to the decoding processors 141 to 14S, and each perform hard decision for the log-likelihood ratio (as the decoding result) output from the corresponding decoding processor, and output a hard-decision value.

The hard-decision units 451 to 45T are respectively assigned to the decoding processors 151 to 15T, and each perform hard decision for the corresponding log-likelihood ratio (as the decoding result) output from the corresponding decoding processor, and output a hard-decision value.

In the above hard decision, a bit value (i.e., 0 or 1) corresponding to a log-likelihood ratio is determined based on whether the log-likelihood ratio is larger or smaller than zero.

The error detectors 161 to 16S performs error detection for the hard-decision values output from the hard-decision units 441 to 44S, and output results of the detection to the log-likelihood ratio controller 20. The error detection may be performed by means of CRC (cyclic redundancy check).

The upper layer processor 17 receives the electric power of the signal from each terminal device 300 from the interference canceller 13, and the hard-decision values from the hard-decision units 441 to 44S and 451 to 45T. Based on the received data, the upper layer processor 17 selects each terminal device 300 as the communication target of the present wireless base station apparatus 1, that is, each terminal device 300 which belongs to the present cell. Similarly based on the above received data, the upper layer processor 17 also selects each terminal device 300 which is subjected to decoding, from among the terminal devices 300 belonging to the other cells.

The upper layer processor 17 assigns decoding processes of the terminal devices 300 of the present cell to the decoding processors 141 to 14S, and also assigns decoding processes of the terminal devices 300 of the other cells to the decoding processors 151 to 15T. The above terminal devices 300 of the other cells are selected ones, and the signal received from each of them has electric power higher than or equal to a predetermined threshold. This threshold is determined in consideration of the communication quality required for the communication between each terminal device 300 as the communication target and the present wireless base station apparatus 1, and also based on a simulation or actually measured values.

Additionally, the upper layer processor 17 controls the interference canceller 13 so that the channel values for the terminal devices 300 of the present cell are output to the corresponding decoding processors 141 to 14S, and the channel values for the terminal devices 300 of the other cells are output to the corresponding decoding processors 151 to 15T. The upper layer processor 17 also obtains the terminal ID included in each decoded signal, and stored the terminal ID of each terminal device 300 as the communication target and the terminal ID of each terminal device 300 which is not the communication target in the present cell.

The log-likelihood ratio receiver 18 receives the log-likelihood ratios as the decoding results of the terminal devices 300 which are not the communication target, from the log-likelihood ratio transmitter 19 of each relevant wireless base station apparatus 1 via the backhaul lines 5 which connect the wireless base station apparatuses 1 with each other. The log-likelihood ratio receiver 18 sends the received log-likelihood ratios to the decoding processors 151 to 15T. Here, the log-likelihood ratios output from the log-likelihood ratio receiver 18 to the decoding processors 151 to 15T are signals corresponding to the terminal devices 300 allocated to the decoding processors 151 to 15T.

In accordance with the control of the log-likelihood ratio controller 20, the log-likelihood ratio transmitter 19 transmits the log-likelihood ratio(s) as the decoding result (received from the decoding processors 141 to 14S) to the log-likelihood ratio receivers 18 of the other wireless base station apparatuses 1 via the backhaul lines 5.

When the log-likelihood ratio controller 20 receives a signal which indicates that an error has been detected from the error detectors 161 to 16S, the log-likelihood ratio controller 20 sends via the backhaul lines 5 log-likelihood ratio request information for requesting the log-likelihood ratios as the decoding results of the relevant terminal devices 300 assigned to the decoding processors 151 to 15T, from the wireless base station apparatus(es) 1 which have the relevant terminal devices 300 as the communication targets. The log-likelihood ratio request information includes the terminal ID of each terminal device 300 of the other cells, which is assigned to the decoding processors 151 to 15T.

The log-likelihood ratio controller 20 may broadcasts the log-likelihood ratio request information through the backhaul lines 5, or may transmit it only to the wireless base station apparatus 1 of each cell to which the relevant terminal devices 300 belong, by accessing, for example, a base station controller (BSC) which manages information of positions of the terminal devices 300 belonging to the other cells, so as to make inquiries about the information.

The log-likelihood ratio controller 20 also receives the log-likelihood ratio request information through the backhaul lines 5. When the received log-likelihood ratio request information includes the terminal ID of any terminal device 300 of the present cell, the log-likelihood ratio controller 20 controls the log-likelihood ratio transmitter 19 to send the log-likelihood ratio corresponding to the relevant terminal ID through the backhaul lines 5, where the log-likelihood ratio is the decoding result and functions as an a-priori value (a-priori information).

In the above-described structure, the decoding processors 141 to 14S and 151 to 15T and the interference canceller 13 in the wireless base station apparatus 1 repeatedly performs decoding while feeding back the interference replica signal by a predetermined number of times, and the decoding processors 141 to 14S and 151 to 15T output the log-likelihood ratios as decoding results. After that, the error detectors 161 to 16S perform error detection for the decoded signals output from the hard-decision units 441 to 44S.

Figure 3:
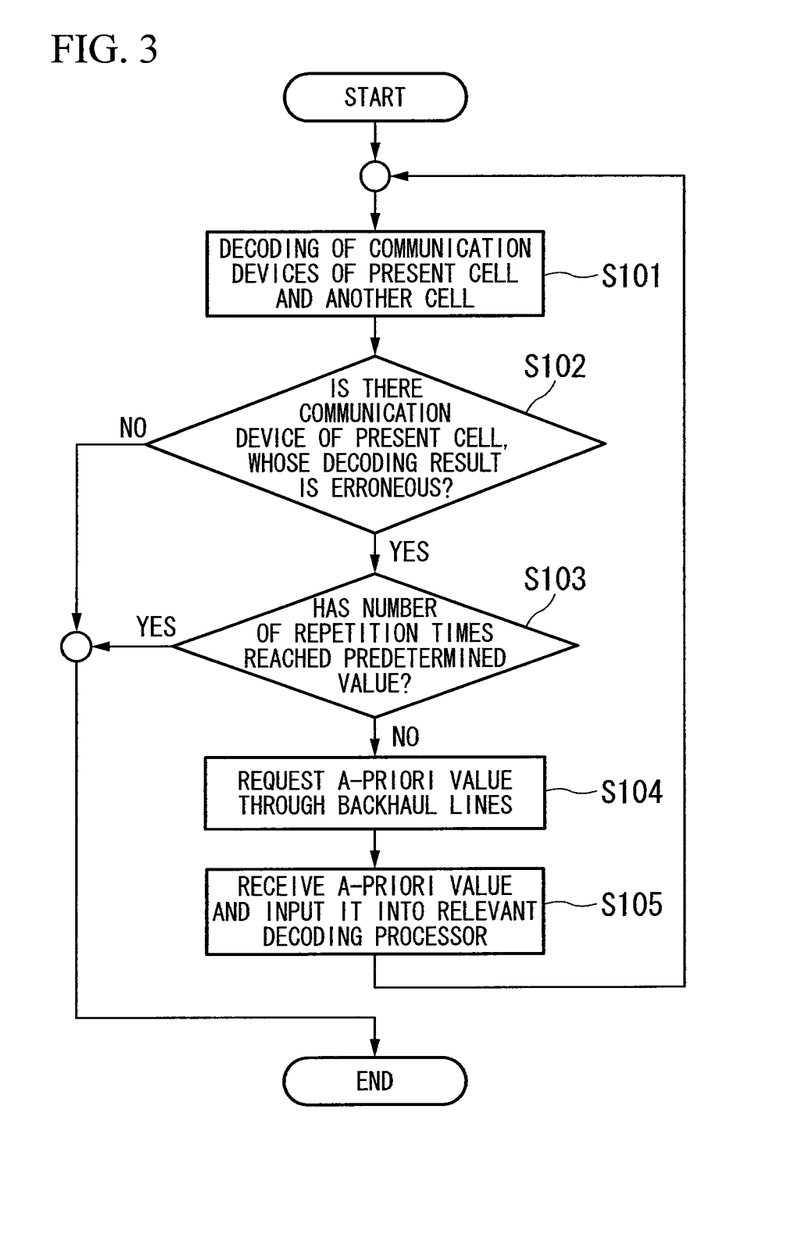
FIG. 3 is a flowchart showing the reception procedure of the wireless base station apparatus 1 in the embodiment.

FIG. 3 is a flowchart showing the reception procedure of the wireless base station apparatus 1. In the following explanation, the wireless base station apparatus 1a performs data transmission and reception to and from the terminal devices 311 to 31K, and receives a signal sent from the terminal device 321 which belongs to another cell 10b (see FIG. 1).

First, in the wireless base station apparatus 1a, the receiver 12 receives signals sent from the terminal devices 311 to 31K and 321, and outputs the received signals to the interference canceller 13. The interference canceller 13 generates channel values based on the received signals, and outputs the generated channel values to the decoding processors 141 to 14S and 151. The decoding processors 141 to 14S and 151 subject the received channel values to decoding, thereby outputting log-likelihood ratios (see step S101).

The error detectors 161 to 16S perform error detection for the decoded signals output from the hard-decision units 441 to 44S, and outputs the results thereof to the log-likelihood ratio controller 20. The log-likelihood ratio controller 20 determines whether the error detectors 161 to 16S have detected an error (see step S102).

When there is no error for all signals (i.e., "NO" in step S102), the reception operation is terminated by, for example, sending an acknowledge signal to the terminal devices 311 to 31K.

When any decoded signal includes an error (i.e., "YES" in step S102), the log-likelihood ratio controller 20 then determines whether the number of repetition times of the decoding process for the relevant frame has reached a predetermined value (see step S103). If the number of repetition times of the decoding process has reached the predetermined value (i.e., "YES" in step S103), the wireless base station apparatus 1a terminates the reception operation by, for example, sending an acknowledge signal to each terminal device 300 from which the accurate signal could be received, and sending a retransmission request to each terminal device 300 from which the accurate signal could not be received. The above predetermined value for the number of repetition times is determined in consideration of a permissive delay required for the relevant traffic.

If the number of repetition times of the decoding process has not reached the predetermined value (i.e., "NO" in step S103), the log-likelihood ratio controller 20 sends the log-likelihood ratio request information to the other wireless base station apparatuses 1b and 1c via the backhaul lines 5 (see step S104), where the log-likelihood ratio request information includes the terminal ID of the terminal device 321 which is not the communication target for the wireless base station apparatus 1a but has also been selected.

The log-likelihood ratio receiver 18 receives a-priori information (an a-priori value) of the terminal device 321, which was sent from another wireless base station apparatus 1b in accordance with the log-likelihood ratio request information, and outputs the received a-priori information to the decoding processor 151 to which decoding for the terminal device 321 has been assigned (see step S105).

The wireless base station apparatus 1a then repeatedly performs the operation from the above step S101 to step S105.

As described above, when there is an error in the decoded signals for the terminal devices 311 to 31K which belong to the present cell of the wireless base station apparatus 1a, the wireless base station apparatus 1a requests the other wireless base station apparatuses 1b and 1c to send the log-likelihood ratio of the terminal device 321 belonging to the other cells, where the signal of the terminal device 321 interferes with the signals sent from the terminal devices 311 to 31K. The wireless base station apparatus 1a then inputs the relevant log-likelihood ratio (received from another wireless base station apparatus 1b) into the decoding processor 151 to which decoding for the terminal device 321 has been assigned, thereby improving the accuracy of the log-likelihood ratio as the decoding result for the terminal device 321 and the interference replica signal which are output from the decoding processor 151. More specifically, the amplitudes (i.e., absolute values) of the likelihood values of the log-likelihood ratio (as the decoding result) and the interference replica signal are increased, and thus the accuracy for the channel separation in the interference canceller 13 is improved, thereby improving the reception quality for the terminal devices 311 to 31K.

That is, the wireless base station apparatus 1b receives the signal from the terminal device 321 (which belong to another cell) with the best reception quality, and the wireless base station apparatus 1a uses the log-likelihood ratio (as the decoding result for the terminal device 321) in the wireless base station apparatus 1b, as an a-priori value. Therefore, the accuracy of the interference replica signal output from the decoding processor 151 (to which decoding of a terminal device 300 belonging to another cell is assigned) can be improved, so that the accuracy of each channel value output from the interference canceller 13 can be improved. Accordingly, the wireless base station apparatus 1 can improve the accuracy for cancellation of intercell interference and the reception quality for the terminal devices 311 to 31K.

When the log-likelihood ratio transmitter 19 sends log-likelihood ratio(s) (i.e., decoding result) output from the decoding processors 141 to 14S as a-priori value(s) via the backhaul lines 5, the log-likelihood ratio transmitter 19 may send only log-likelihood ratios having no error in accordance with the detection results of the error detectors 161 to 16S. Accordingly, it is possible to prevent an log-likelihood ratio having an error from being transmitted to another wireless base station apparatus 1, which degrades the accuracy of the relevant channel value output from the interference canceller 13 of this wireless base station apparatus 1. Therefore, it is possible to prevent an error from being propagated, and also to decrease the amount of transmitted data for the log-likelihood ratio through the backhaul lines 5.

In addition, when the log-likelihood ratio transmitter 19 sends the log-likelihood ratio(s) output from the decoding processors 141 to 14S as a-priori value(s) via the backhaul lines 5, the log-likelihood ratio transmitter 19 may send the hard-decision values of the relevant log-likelihood ratios. In such a case, the log-likelihood ratio receiver 18 applies a predetermined likelihood value (e.g., 1) to each hard-decision value received via the backhaul lines 5, so as to convert the hard-decision value into a log-likelihood ratio. The optimum bandwidth determination unit 18 outputs each converted ratio to the decoding processors 151 to 15T. Accordingly, it is possible to decrease the amount of data transmitted by the log-likelihood ratio transmitter 19 via the backhaul lines 5.

Additionally, when the log-likelihood ratio transmitter 19 sends the log-likelihood ratio(s) output from the decoding processors 141 to 14S as a-priori value(s) via the backhaul lines 5, the log-likelihood ratio transmitter 19 may send the hard-decision values of the decoding results and reliability coefficients for the decoding results. The reliability coefficient is the average electric power of a log-likelihood ratio, that is, the average of the amplitude (i.e., absolute value) of the log-likelihood ratio (as the decoding result) during a specific period of time. Therefore, in comparison with the direct transmission of the log-likelihood ratio, the amount of transmitted data can be reduced. Additionally, in comparison with the hard-decision value transmission, a log-likelihood ratio based on the reception state for the relevant decoding result can be input into the decoding processors 151 to 15T so as to contribute to the interference cancellation.

In the above case, if the relevant likelihood value is higher than a predetermined value, that is, the decoding result is probable, the log-likelihood ratio transmitter 19 may send only the hard-decision values without sending the reliability coefficients. Accordingly, it is possible to reduce the amount of data transmission through the backhaul lines 5, and to perform the log-likelihood ratio transmission and reception in consideration of the likelihood value of the relevant decoding result.

The log-likelihood ratio controller 20 may request only directly-connected other wireless base station apparatuses 1 (connected directly via the backhaul lines 5) to send the relevant log-likelihood ratio in accordance with the traffic type. The traffic type indicates the size (relatively large or relatively small) of the permissive delay. When the permissive delay is relatively small, an increase in the time required for obtaining the log-likelihood ratio can be prevented by requesting only the directly-connected wireless base station apparatuses 1 to send the relevant log-likelihood ratio. Accordingly, the time required for the decoding can be shorter than or equal to a specific time, thereby preventing the communication quality for the traffic having a small permissive delay from being degraded.

On the contrary, for the traffic having a relatively large permissive delay, the reception quality can be improved by obtaining the relevant log-likelihood ratio.

Figure 4:
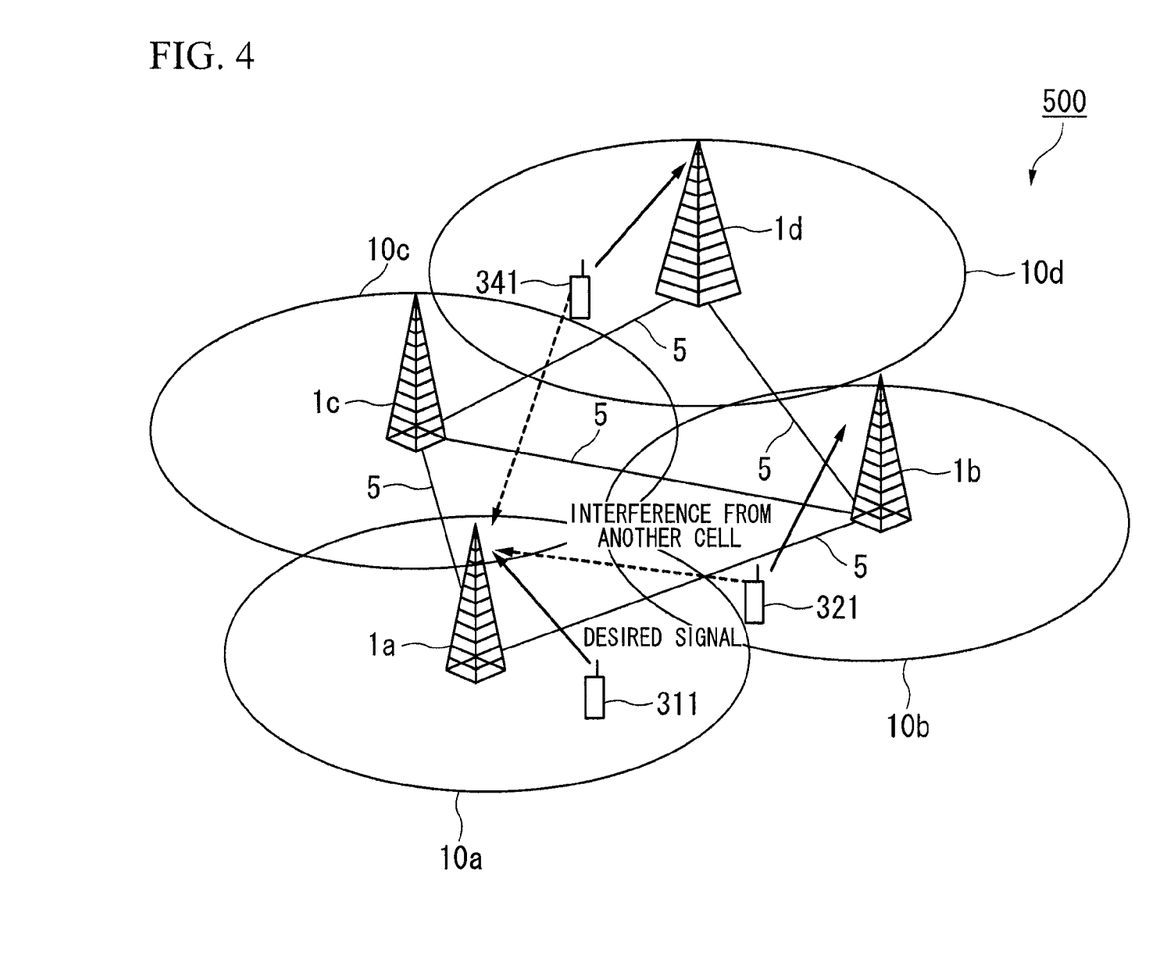
FIG. 4 is a schematic diagram showing an example of the structure of a wireless communication system 500 as a variation of the embodiment.

FIG. 4 shows an example of the structure of a wireless communication system 500 as a variation. As shown in FIG. 4, the wireless communication system 500 may include wireless base station apparatuses 1a, 1b, 1c, and 1d, which respectively form cells 10a to 10d. When the permissive delay for the traffic is relatively small, the wireless base station apparatus 1a operates as follows.

In the wireless base station apparatus 1a, the log-likelihood ratio controller 20 requests the directly-connected wireless base station apparatus 1b to send the a-priori information for the terminal device 321 belonging to another cell via the backhaul lines 5, and does not request the wireless base station apparatus 1d, which is not directly connected to the wireless base station apparatus 1a, to send the log-likelihood ratio for the terminal device 341 belonging to the cell of the wireless base station apparatus 1d. Therefore, when the time required for obtaining the log-likelihood ratio of the terminal device 341 is longer than the permissive delay required for the traffic, decoding is performed without using the relevant log-likelihood ratio, so that the permissive delay is satisfied.

As described above, the log-likelihood ratio controller 20 may compare the time required for obtaining the log-likelihood ratio with the permissive delay of the traffic, and request the log-likelihood ratio within a time range which satisfies the permissive delay.

If the log-likelihood ratio receiver 18 cannot receive the log-likelihood ratio within a predetermined period of time, the log-likelihood ratio receiver 18 may output a dummy signal which indicates that the likelihood value is 0. Accordingly, when a considerable time is required for obtaining the log-likelihood ratio, the wireless base station apparatus 1 can perform the decoding while giving priority to the satisfaction for traffic having a small permissive delay.

Although the above-described embodiment has the fixedly-located wireless base station apparatuses 1 and the movable terminal devices 300, the present invention can also be applied to communication between fixedly-located wireless communication devices, or communication between movable wireless communication devices.

Also in the above-described embodiment, the error detectors 161 to 16S performs error detection for the hard-decision results output from the hard-decision units 441 to 44S. However, instead thereof, error detection may be performed for the log-likelihood ratios as the decoding results output from the decoding processors 141 to 14S.

The above-described wireless base station apparatus 1 may include a computer system. In such a case, the above-described reception procedure is stored as a program in a computer-readable storage medium, and the procedure is executed by a computer which loads and executes the program.

The computer-readable storage medium may be a magnetic disk, a magneto-optical disk, a CD-ROM, a DVD-ROM, or a semiconductor memory. Such a computer program may be provided to a computer via a communication line, and the computer which receives the program may execute the program.

While preferred embodiments of the present invention have been described and illustrated above, it should be understood that these are exemplary embodiments of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A wireless base station apparatus which communicates with a plurality of first terminal devices belonging to a present cell of the wireless base station apparatus, based on an interleave division multiple access method that assigns an individual interleave pattern to each terminal device in advance, the wireless base station apparatus comprising:
   a receiver that receives signals sent from the first terminal devices and at least a signal sent from a second terminal device belonging to another cell;
   a computing device that computes channel values that are estimated values for respective signals sent from the first terminal devices and the second terminal device by cancelling interference between the signals, that were received by the receiver, by using interference replica signals computed for the received signals;
   a controller that sends information for requesting a second wireless base station apparatus which communicates with the second terminal device to send a log-likelihood ratio that is a result of decoding performed based on a signal received from the second terminal device;
   first decoding processors, each performing decoding using the channel value for each first terminal device, and feeding back the interference replica signal, that is computed using a log-likelihood ratio as a result of the decoding, to the computing device; and
   a second decoding processor that performs decoding using the log-likelihood ratio received from said second wireless base station apparatus and the channel value for the second terminal device, and feeds back the interference replica signal, that is computed using a log-likelihood ratio as a result of the decoding, to the computing device,
   wherein error correction that repeats the feedback operation from the first decoding processors and the second decoding processor to the computing device is performed.

2. The wireless base station apparatus in accordance with claim 1, wherein the second terminal device as a target for feeding back the interference replica signal has reception electric power higher than or equal to a predetermined threshold.

3. The wireless base station apparatus in accordance with claim 1, further comprising:
   a log-likelihood ratio transmitter, wherein when the log-likelihood ratio transmitter receives from said second wireless base station apparatus information for requesting the log-likelihood ratio for at least one of the first terminal devices, the log-likelihood ratio transmitter sends the log-likelihood ratio based on the channel value for the relevant first terminal device.

4. The wireless base station apparatus in accordance with claim 3, wherein the log-likelihood ratio transmitter sends the log-likelihood ratio to said second wireless base station apparatus if the log-likelihood ratio includes no error, and does not send the log-likelihood ratio if the log-likelihood ratio includes an error.

5. The wireless base station apparatus in accordance with claim 3, wherein the log-likelihood ratio transmitter sends the log-likelihood ratio in a form of a hard-decision value and a reliability coefficient of the log-likelihood ratio.

6. The wireless base station apparatus in accordance with claim 1, wherein when the result of the decoding of any first terminal device includes an error, the controller sends information for requesting said second wireless base station apparatus to send the log-likelihood ratio for the second terminal device.

7. A wireless communication method performed by a wireless base station apparatus which communicates with a plurality of first terminal devices belonging to a present cell of the wireless base station apparatus, based on an interleave division multiple access method that assigns an individual interleave pattern to each terminal device in advance, the wireless communication method comprising the steps that:

receives signals sent from the first terminal devices and at least a signal sent from a second terminal device belonging to another cell;

computes channel values that are estimated values for respective signals transmitted from the first terminal devices and the second terminal device by cancelling interference between the signals, that were received by the receiver, by using interference replica signals computed for the received signals;

sends information for requesting a second wireless base station apparatus which communicates with the second terminal device to send a log-likelihood ratio that is a result of decoding performed based on a signal received from the second terminal device;

performs decoding using the channel value for each first terminal device, and feeds back the interference replica signal, that is computed using a log-likelihood ratio as a result of the decoding, to the step of computing the channel values; and performs decoding using the log-likelihood ratio received from said second wireless base station apparatus and the channel value for the second terminal device, and feeds back the interference replica signal, that is computed using a log-likelihood ratio as a result of the decoding, to the step of computing the channel values, wherein error correction that repeats the feedback operation from the first decoding processors and the second decoding processor to the step of computing the channel values is performed.

\* \* \* \* \*